Feb. 19, 1935.    C. H. STERLING    1,991,582
METHOD OF MAKING VALVE TAPPETS
Filed June 15, 1931
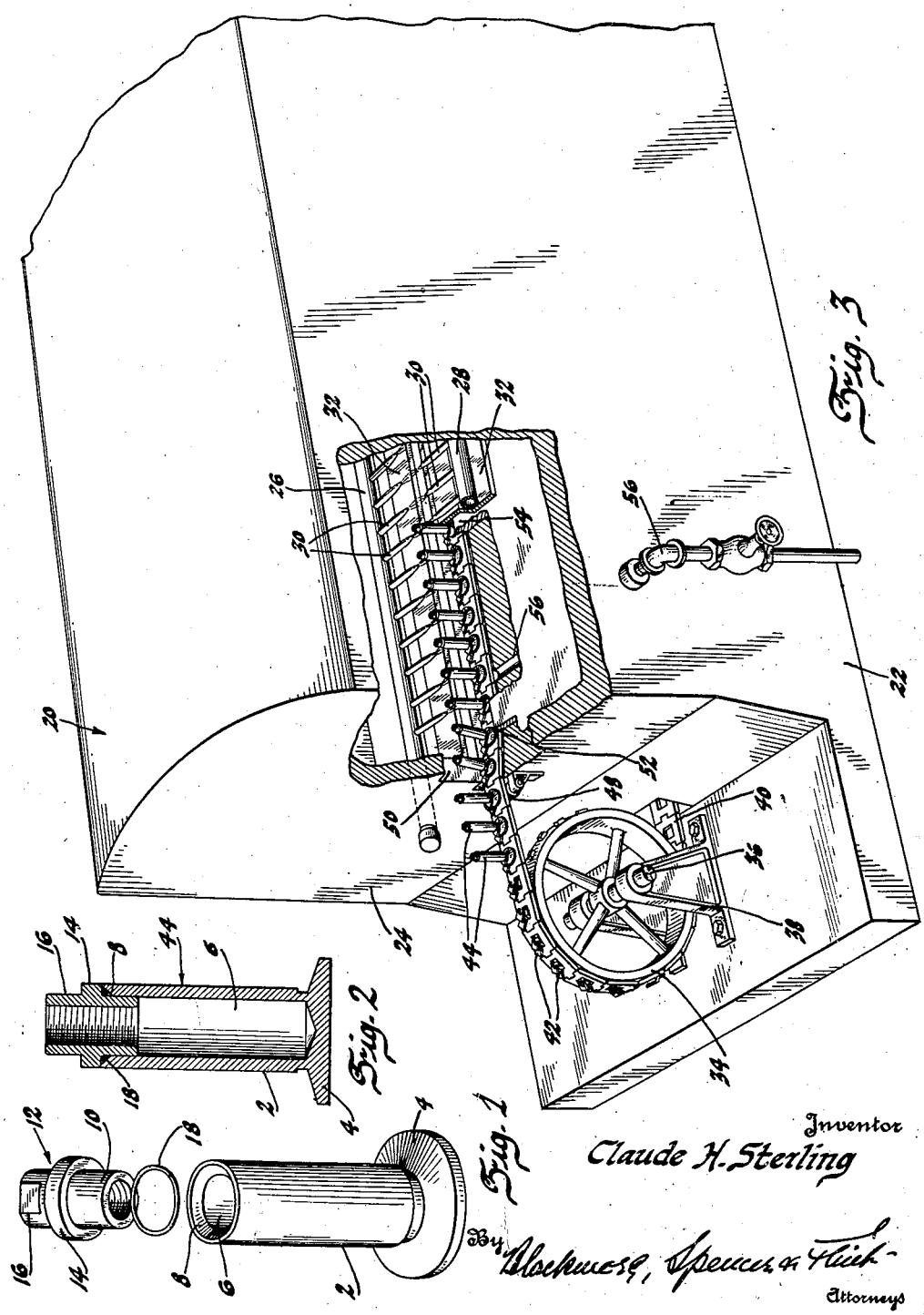
Inventor
Claude H. Sterling
By Blackmore, Spencer & Flick
Attorneys Patented Feb. 19, 1935

1,991,582

UNITED STATES PATENT OFFICE 1,991,582

METHOD OF MAKING VALVE TAPPETS

Claude H. Sterling, Syracuse, N. Y., assignor to General Motors Corporation, Detroit, Mich., a corporation of Delaware Application June 15, 1931, Serial No. 544,480

7 Claims. (Cl. 29—156.7)

This invention relates to valve tappets and has particular reference to the valve tappets used on internal combustion engines of automotive vehicles.

In prior practice, it has been customary to make the valve tappet of cast iron and to attach thereto a cylindrical steel shank. The valve tappet and adjusting means were attached to the shank usually through a threaded connection. It has been difficult to obtain a clean smooth surface on the shank when the joint is electrically welded, as the welding usually leaves depressions in the surface which cannot be cleaned up in subsequent operations.

In the present invention, the shank is cast integral with the tappet head and is bored or hollow, both shank and head being of cast iron. The bore of the tappet is chamfered and a steel socket or nipple inserted in the end of the bore. A small brass wire of about .020" or .030" in diameter is slipped over the nipple before assembling the nipple into the cast iron member which is chamfered to provide space for the wire. Heat is then applied to the exterior of the shank until the brass fuses and flows between the shank and socket. This will make a very satisfactory brazed connection and rigidly and permanently connect the cast shank and steel socket. The socket is threaded interiorly for attachment to the usual adjusting member of the tappet.

The heating of the shank is accomplished in a furnace such as by the use of gas jets heating diametrically opposite parts of the shank. As the heads and shanks pass through the furnace, the head portions are preferably maintained in a water bath to keep them cool and prevent overheating. The heat is applied gradually, a smaller jet of gas first being applied when the shanks enter the furnace. The quantity of gas delivered from the jets increases as the tappet enters the furnace and the application of heat is discontinued as soon as the brass ring is melted. The valve heads and tappets pass through the furnace on an endless chain. If desired, an air blast may be used instead of the water bath.

On the drawing:

Figure 1 shows an expanded view of the tappet head and shank of the invention.

Figure 2 is a sectional view through the shank and head before it has entered the furnace and before the brass ring is melted.

Figure 3 is a perspective view partially in section of the furnace for melting the brass ring and effecting the bond between the shank and socket.

Referring to the drawing, the numeral 2 indicates the shank of the valve tappet 4. The shank has the bore or is hollow as shown at 6 and the bore is chamfered as shown at 8. In the bore 6, there is received the cylindrical portion 10 of a socket member indicated as a whole at 12. The socket member has the annular shoulder 14 which fits on the end of the shank as shown in Figure 2. The socket has the outer extension 16 which may have flattened sides for the application of a wrench or other suitable tool. When the portion 10 of the socket is fitted into the bore 6, the chamfer will make a space between the shank end at the angle between the portion 10 and the shoulder 14. This space is filled by a quantity of brass in the form of a wire ring 18 which fits snugly within the recess. The fit between the portion 10 and the bore 6 is a rather close one so as to leave but little space between the two. The fit, however, is not so close as not to allow an easy manual assembly of the parts.

When the parts are assembled in the relation shown in Figure 2, they are passed through a suitable slow-heat furnace, indicated as a whole at 20. The furnace has the base portion 22 and the upper housing portion 24. Inside the housing, there are provided the pipes 26 or 28 which receive gas from a suitable source. Oppositely positioned jets 30 extend from the pipes 26 and 28 and project toward each other. A baffle 32 extends under each jet to prevent the heat from going below. The baffle may be made of asbestos or any suitable material.

On the base 22 at one end of the housing 24, a wheel 34 is mounted on the axle 36 positioned in brackets 38. Over the wheel there runs an endless belt 40 having suitable attaching members 42 therein and in these attaching members there are received the assembled shanks and sockets indicated as a whole at 44. The belt passes over a roller 48 mounted at an opening 50 in the furnace. Immediately inside the furnace beyond the opening 50, the belt 40 is downwardly directed by means of the guides 52 which direct the belt downwardly into a trough 54 containing water constantly supplied from the pipe 56. The purpose of water in the bath 54 and the baffle 32 is to keep the heads 4 cool and to prevent the heat from the gas jet 30 extending down on the shank 2. Instead of water an air blast may be provided.

As the parts 44 pass through the furnace, they are positioned between two oppositely disposed jets 30. The heating in the furnace is preferably, though not necessarily, a slow operation. The flame from the gas jet will impinge against the end of the shank 2 to cause the heat to pass therethrough and into the socket 16 and brass ring 18. Each successive jet 30 in the housing 24 preferably has a slightly larger opening to allow a larger amount of gas and heat to pass therefrom to additionally heat the ends of the shanks. The heat finally melts the brass ring 18 which has a melting point lower than that of cast iron or steel. As soon as the brass ring 18 fuses the metal will flow between part 10 and the end of the shank and form a rigid and permanent bond between the steel and cast iron. When the ring 18 is melted, the assemblies 44 have passed the last jet and are allowed to cool.

By the use of the process described, a very rigid bond is obtained between the socket and shank end and in the heating in the furnace, an annealing function is performed on the shank and the steel increasing the ductility of the metal and removing the initial brittleness in the casting. The slow heat in the furnace gradually draws or toughens the end of the shank to harden it. The length of the furnace and the heat applied are sufficient to allow for a time element necessary to melt the brass by a slow heat.

I claim:

1. The method of securing a steel socket in the bored cast iron shank of a valve tappet, consisting of chamfering the end of the bore, placing a ring of brass on the steel socket, inserting the socket in the shank end so that the ring fits in the chamfer, then applying heat to melt the ring and cause the molten metal to flow between the shank and socket, to form a permanent bond and then allowing the valve to cool.

2. The method of securing a steel socket in the bored cast iron shank of a valve tappet, consisting of chamfering the bored end of the shank, placing the socket in the end of the bore with a quantity of brass interposed in the chamfer, then applying heat to cause the brass to melt and flow between the socket and shank end, and then allowing the valve to cool to form a permanent bond therebetween.

3. The method of securing a steel socket in the bored chamfered end of the cast iron shank of a valve tappet, consisting of placing the socket in the shank and with a quantity of brass in the chamfer, then passing the tappet through a furnace to heat the shank end while maintaining the shank head in a cool state, the heat causing the brass to melt and flow between the socket and shank end, and then allowing the tappet to cool.

4. The method of securing a steel socket in the bored chamfered end of the cast iron shank of a valve tappet, consisting of placing the socket in the shank end with a quantity of metal in the chamfer, the melting point of said quantity of metal being less than that of cast iron or steel, then in heating the shank end to cause the quantity of metal to fuse and flow between the socket and shank, and then allowing the tappet to cool.

5. The method of securing a steel socket in the bored chamfered end of the cast iron shank of a valve tappet, consisting of placing the socket in the shank with a quantity of brass in the chamfered end, then passing the tappet through a furnace to heat the shank to cause the brass to melt and to flow between the socket and shank end, and then allowing the tappet to cool.

6. The method of securing a metal socket in the bored chamfered end of the metal shank of a valve tappet without the use of any flux, consisting of placing the socket in the bore of the shank with a quantity of brass in the chamfered end between the socket and shank, then heating the shank to cause the brass to melt and flow between the socket and shank, and then allowing the tappet to cool.

7. The method of securing a metal socket in the bored chamfered end of the metal shank of a valve tappet without the use of any flux, consisting of placing the socket in the bore of the shank with a quantity of metal in the chamfered end between the socket and shank, the melting point of said quantity of metal being less than that of the materials of which the socket or the shank are made, then heating the shank to cause the quantity of metal to fuse and flow between the socket and shank and then allowing the tappet to cool.

CLAUDE H. STERLING.